INVENTOR.
WILLIAM D. ALLISON
ATTORNEYS

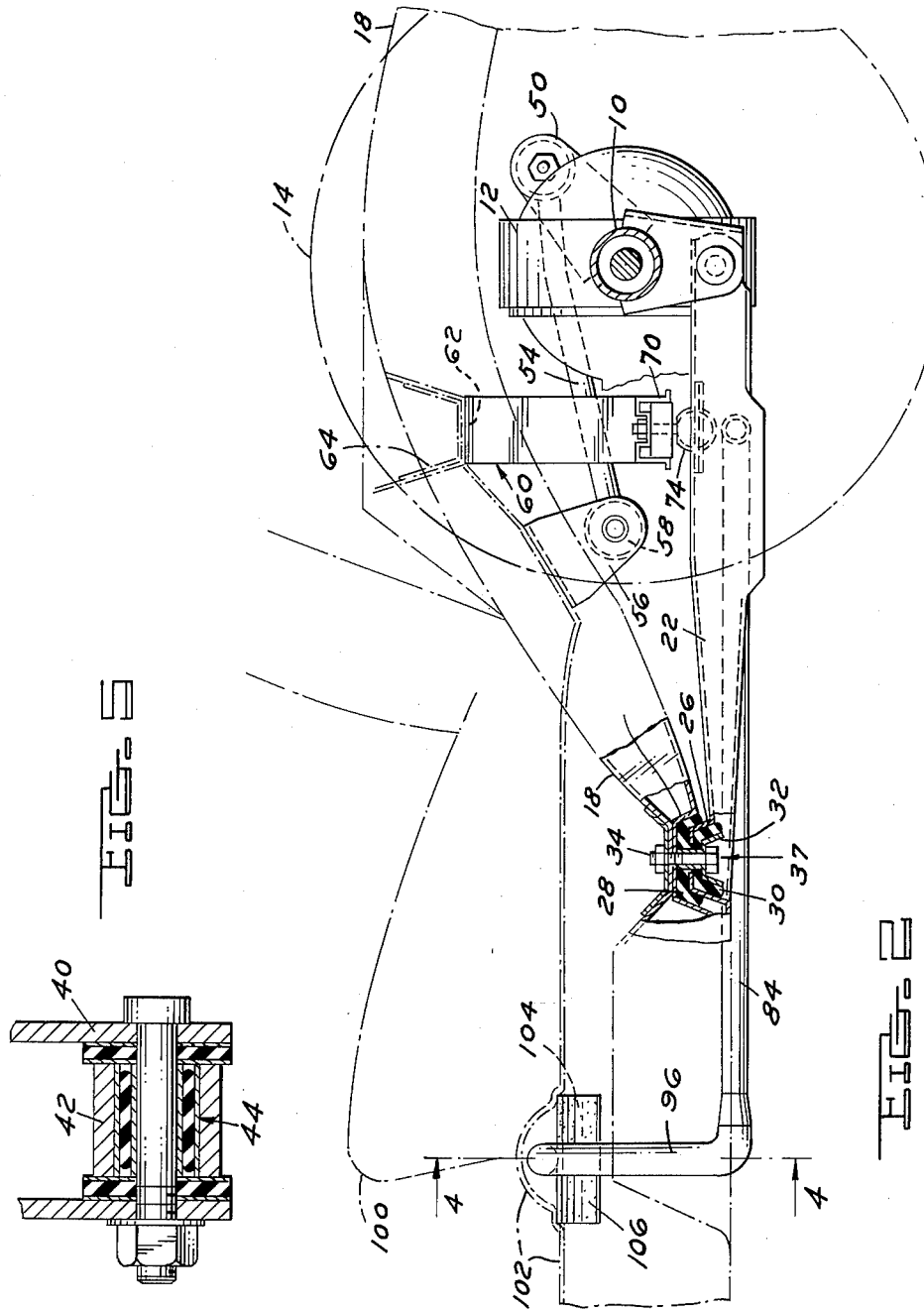

Aug. 24, 1965  W. D. ALLISON  3,202,236
LINKAGE TYPE VEHICLE SUSPENSION
Filed Nov. 29, 1963  3 Sheets-Sheet 3
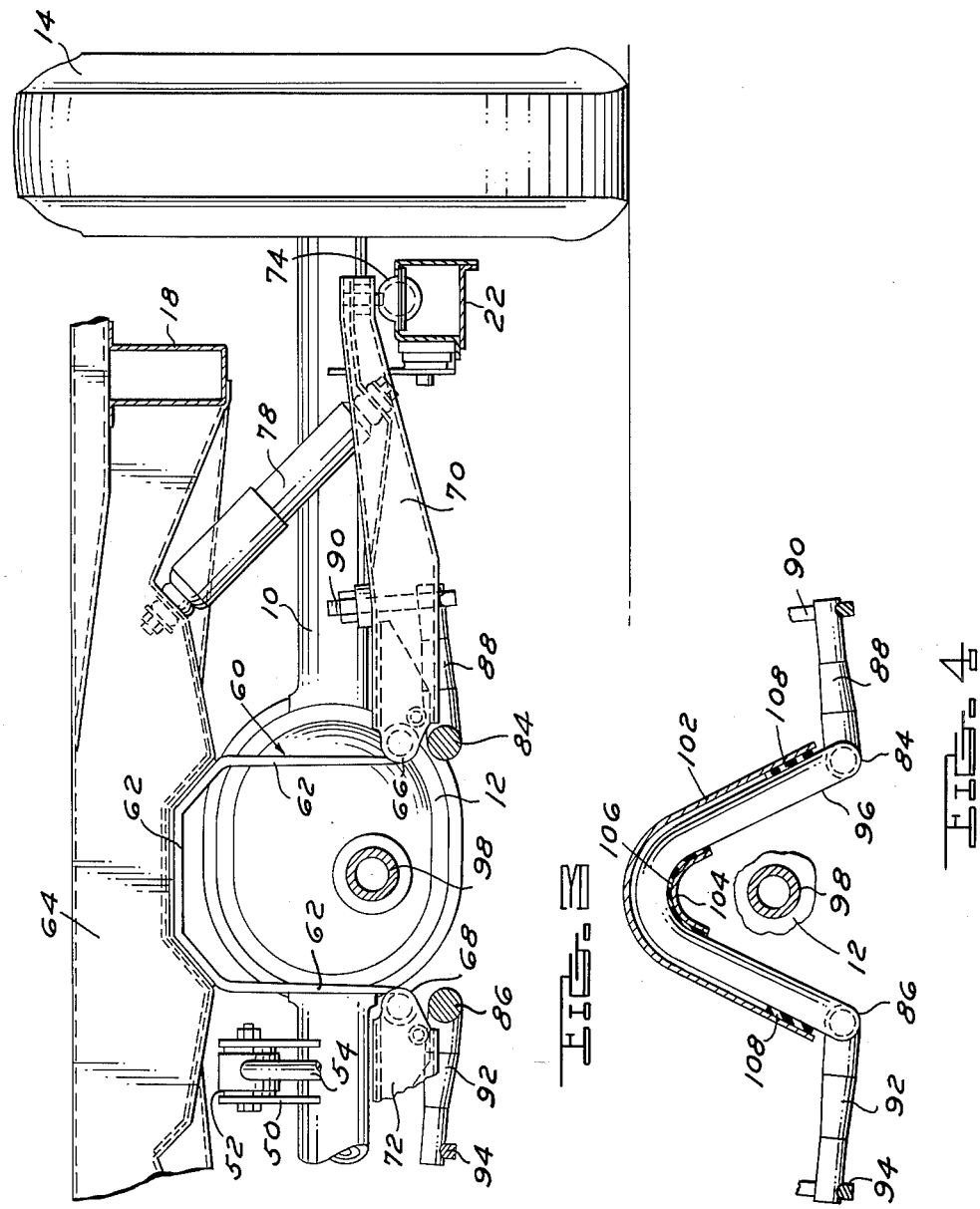
WILLIAM D. ALLISON
INVENTOR.
BY John R. Faulkner
Clifford L. Sadler
ATTORNEYS

3,202,236
LINKAGE TYPE VEHICLE SUSPENSION
William D. Allison, Grosse Pointe Farms, Mich., assignor to Ford Motor Company, Dearborn, Mich., a corporation of Delaware
Filed Nov. 29, 1963, Ser. No. 326,789
5 Claims. (Cl. 180—73)

The present invention relates generally to motor vehicle suspension systems, and more particularly to a linkage type suspension for a solid axle.

In accordance with this invention and in its preferred embodiment, a rigid rear axle housing is positioned by a pair of lower trailing arms and a single upper arm. These arms locate the axle housing longitudinally with respect to the vehicle body.

A yoke-shaped leaf spring is secured to a body frame member and has depending ends the straddle the differential housing. Laterally extending links interconnect the ends of the yoke spring and the trailing arms. This latter construction positions the axle housing laterally with respect to the vehicle and at the same time, permits slight lateral displacement in response to side loading due to the resiliency of the yoke spring.

The trailing arms extend forwardly and outwardly from the axle housing so that when the suspension is subjected to side loads and lateral displacement, the axle housing will be canted in a direction to provide understeer. This suspension is generally of the type described in my copending application Serial Number 121,059, filed June 30, 1961, and entitled Vehicle Wheel Suspension Having Lateral Compliance.

A generally U-shaped torsion bar having torsional segments extending parallel to the input shaft of the differential has its ends secured to the lateral links that interconnect the yoke spring and the trailing arms. The midportion of the torsion bar is bent upwardly in an arch fashion and is journalled in a body sheet metal support situated beneath the forward edge of the rear passenger seat of the vehicle. This center portion of the bar extends up and over the drive shaft.

A suspension system constructed according to the present invention is distinguishable because it provides increased resistance to lateral skidding of the rear wheels, thereby promoting vehicle safety. The rear axle understeer characteristics improve road handling and are responsive to side loads rather than body roll. A nonlinear spring rate is inherent to the design of the torsion bar spring. The spring rate is lower than standard at design height and higher in jounce and rebound. By using a common spring for both the left and right wheels, manufacturing economies will be realized. The torsion spring is attached to the body at its forward end and transmits torque to that support only when the rear wheels are at different elevations.

The many objects and advantages of this invention will become apparent from the following description when considered in connection with the accompanying drawings, in which:

FIGURE 2 is a side elevational view of a suspension of FIGURE 1;

FIGURE 3 is a front elevational view of the suspension of FIGURE 1;

FIGURE 4 is an elevational view disclosing the torsion spring and its chassis attachment in greater detail; and FIGURE 5 is a view partly in section of one of the pivots for one of the suspension arms.

Figure 1:
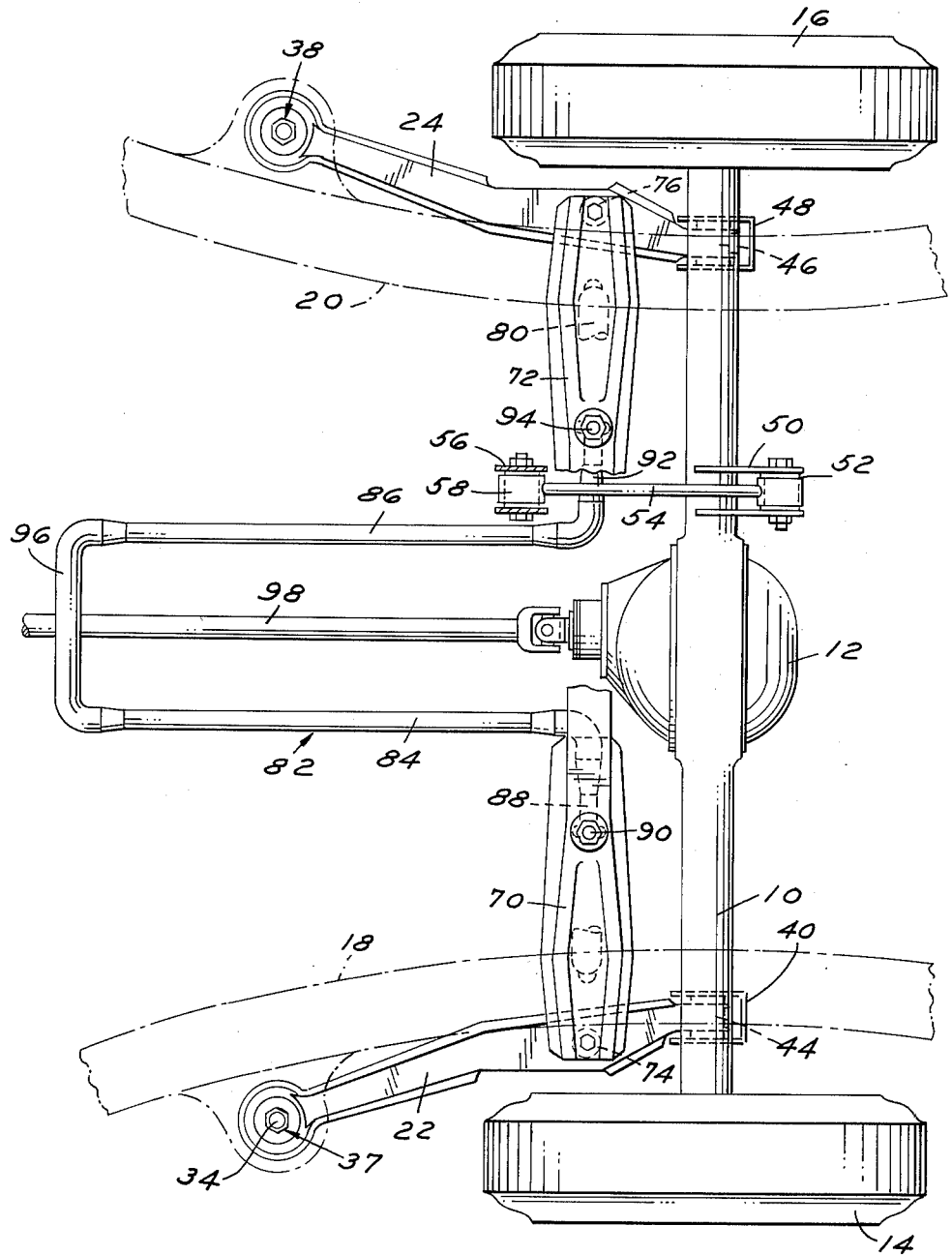
FIGURE 1 is a top plan view of a vehicle suspension system embodying the present invention.

Referring now to the drawings for a better understanding of the present invention as incorporated in a preferred embodiment, FIGURE 1 discloses a solid axle housing 10 having a centrally situated differential housing 12. Left and right road wheels 14 and 16 are located at the outer ends of the housing 10.

The chassis of the vehicle includes left and right frame side rails 18 and 20. These components may be portions of a separate frame or they may be formed integrally of body sheet metal.

The axle housing 10 and wheels 14, 16 are positioned longitudinally in the vehicle by left and right trailing arms 22 and 24. FIGURE 2 illustrates the forward pivotal connection for the left trailing arm 22. The pivot for the right arm 24 is identical. The forward end of arm 22 is provided with a pocket portion 26 that is sandwiched between a pair of cup-shaped rubber elements 28 and 30. A retainer 32 is nested within the lower rubber 30 and the entire assembly is secured by a bolt 34 in a pocket 36 formed in the side rail 18. For identification purposes, the forward pivotal connection of the left arm 22 to the side rail 18 is identified by reference numeral 37 and the forward pivotal connection of the right arm 24 to the side rail 20 is identified by the reference numeral 38.

A channel-shaped bracket 40 extends downwardly from the axle housing 10 adjacent the left wheel 14. An eye 42 is formed at the rear end of the left trailing arm 22 which is pivotally connected to the bracket 40 by a resilient bushing assembly 44. Similarly, a bushing assembly 46 pivotally connects the rear end of the right arm 24 with a depending right-hand axle housing bracket 48.

A bracket 50 is welded to the axle housing 10 and extends upwardly and rearwardly therefrom. The bracket 50 provides a support for a resilient pivotal connection 52 for an upper suspension arm 54. Upper arm 54 extends forwardly and downwardly from the pivotal connection 52 and has its forward end secured to a frame bracket 56 by a resilient bushing 58.

The trailing arms 22 and 24, together with the upper arm 54, positions the axle housing 10 and the wheels 14, 16 longitudinally with respect to the vehicle chassis. The upper arm 54 is located to the right of the differential 12 and extends forwardly and downwardly in part to compensate for engine torque. In a novel fashion, the trailing arms 22, 24 extend forwardly and outwardly in order to provide understeer characteristics upon lateral displacement of the axle housing 10.

The axle housing 10 is positioned laterally with respect to the vehicle frame by resilient means. A yoke shaped spring 60 has its midportion 62 secured to a frame cross member 64 that interconnects the left and right side rails 18 and 20. The yoke spring 60 has a pair of depending spring legs 62 and 64 that terminate in spring eyes 66 and 68. Left and right laterally extending links 70 and 72 interconnect the spring legs 62, 64 with the trailing arms 22, 24. The inner ends of the links 70 and 72 are pivotally connected to the spring eyes 66 and 68, respectively. A ball joint assembly 74 joins the outer end of the link 70 with the left trailing arm 22 for universal pivotal movement. Similarly, a ball joint 76 joins the outer end of link 72 with the right trailing arm 24. As shown in FIGURE 3, a telescopic shock absorber 78 is interposed between the frame cross member and the link 70. FIGURE 1 discloses a portion of right-hand shock absorber 80.

A generally U-shaped torsion spring 82 is interposed between the lateral links 70 and 72. The spring 82 has a pair of torsional spring portions 84 and 86 that extend generally parallel to the longitudinal axis of the vehicle. The rear end of torsional segment 84 is provided with a right angle integral lever arm 88. The end 88 is positioned in a spring seat formed in the link 70 and held in place by an eye bolt 90 that engages a notch formed at the tip of the bar end 88. In a similar fashion, the extremity of the torsional segment 86 is formed with a right angle bent end 92 that is seated in the link 72. An eye bolt 94 secures the tip of the bar onto the link 72.

The forward end of the torsional segments 84, 86 of spring 82 are integrally connected by a bridging portion 96. As illustrated in FIGURE 4, the bridging portion extends in an arch fashion over the drive shaft 98 which is connected to the input of the differential 12. With reference to FIGURE 2, the vehicle is provided with a rear passenger seat 100 that is secured to a floor pan 102 of the vehicle chassis. A sheet metal member 104 incorporates a rubber layer 106 that journals the midportion of the torsion spring 82. A pair of rubber pieces 108 are also provided, as disclosed in FIGURE 4, to prevent metal to metal contact with the floor pan 102.

The torsion spring 82 may be forged from a single piece of bar stock. The various bent portions have enlarged diameters to accommodate the bending loads present at those locations.

The foregoing description presents a suspension system that is characterized by its improved handling characteristics and its harshness reduction. The laterally extending links 70 and 72, in conjunction with the yoke spring 60, position the trailing arms 22, 24 and axle 10 laterally with respect to the chassis. Due to the resiliency of the spring legs 62 and 62, the chassis may move or be displaced in a transverse direction relative to the axle 10 when the vehicle is subjected to side load such as are caused by centrifugal force while cornering. Because the trailing arms 22, 24 are played outwardly, lateral displacement of the axle housing 10 will be accompanied by a slight canting in a direction to provide understeer. If the vehicle of FIGURE 1 is engaged in the right-hand turn, centrifugal force will tend to move the frame members 18 and 20 to the left and due to the resiliency of the yoke spring 60, some lateral displacement in that direction is permitted. Because the trailing arms 22 and 24 are angled forwardly and outwardly, movement of the frame members 18, 20 to the left will be accompanied by slight rearward movement of the right pivot 46 and slight forward movement of the left pivot 44. This produces a steering effect upon the wheels 14, 16 with respect to the chassis and in a direction of understeer.

The one-piece spring 82 provides a novel method for supporting the body and chassis upon the trailing arms. The spring has nonlinear characteristics so that increased deflection is met with an increase in spring rate. The spring is compact and "tucked" out of the way.

The foregoing description presents the presently preferred embodiment of this invention. Alterations and modifications may occur to those skilled in the art that will come within the scope and spirit of the following claims.

I claim:

1. A vehicle suspension system having a vehicle chassis, a transverse axle, a wheel rotatably mounted at each end of said axle, a pair of generally longitudinally extending suspension arms each pivotally connected to said chassis and said axle, a pair of laterally extending links each having an outer end pivotally connected to said suspension arms, resilient mounting means connecting the inner ends of said links to said chassis, said links and resilient means being adapted to resiliently position said suspension arms laterally with respect to said chassis, said suspension arms extending forwardly and outwardly to provide an understeer effect upon lateral movement of said arms and axle, a torsion spring means having a pair of torsionally loaded segments, one of said segments being connected to one of said links and extending in a generally longitudinal direction, the other of said segments being connected to the other of said links and extending in a generally longitudinal direction, said torsion spring means being constructed to torsionally resist jounce and rebound movement of said links.

2. A vehicle having a suspension system comprising a chassis, an axle housing, a pair of suspension arms each pivotally connected at one end to said chassis and at their other ends to said axle housing, said axle housing extending in a generally transverse direction and rotatably supporting a road wheel at each of its ends, said axle housing including a centrally situated differential gear unit, a yoke spring secured to said chassis and having depending leg portions straddling a portion of said differential gear unit, laterally extending links interconnecting said leg portions and said suspension arms, a generally U-shaped torsion bar having one end secured to one of said lateral links and its other end secured to the other lateral link, said torsion bar having a pair of torsional segments extending generally parallel to the longitudinal axis of said vehicle.

3. A vehicle having a suspension system comprising a chassis, an axle housing, a pair of suspension arms each pivotally connected at one end to said chassis and at their other ends to said axle housing, said axle housing extending in a generally transverse direction and rotatably supporting a road wheel at each of its ends, said axle housing including a centrally situated differential gear unit, a yoke spring secured to said chassis and having depending leg portions, laterally extending links interconnecting said leg portions and said suspension arms, a generally U-shaped torsion bar having one end secured to one of said lateral links and its other end secured to the other lateral link, said torsion bar having a pair of torsional segments extending generally parallel to the longitudinal axis of said vehicle, a bridging portion integrally interconnecting said torsion segments and having its midportion supported by said chassis, an input shaft connected to said differential gear unit, said bridging portion straddling said shaft.

4. A vehicle having a suspension system comprising a chassis, an axle housing, a pair of suspension arms each pivotally connected at one end to said chassis and at their other ends to said axle housing, said arms being inclined with respect to each other and extending in a forwardly and outwardly direction, said axle housing extending in a generally transverse direction and rotatably supporting road wheels at each of its ends, said axle housing including a centrally situated differential gear unit, a yoke spring secured to said chassis and having depending leg portions, laterally extending links interconnecting said leg portions and said suspension arms, a generally U-shaped torsion bar having one end secured to one of said lateral links and its other end secured to the other lateral link, said torsion bar having a pair of torsional segments extending generally parallel to the longitudinal axis of said vehicle, a bridging portion integrally interconnecting said torsional segments and having its midportion supported by said chassis, an input shaft connected to said differential gear unit, said bridging portion straddling said shaft.

5. A vehicle suspension system having a vehicle chassis, a transverse axle housing, left and right road wheels rotatably connected to the ends of said housing, a pair of generally longitudinally extending suspension arms interconnecting said chassis and said housing, a pair of laterally extending links pivotally connected at their outer ends to said suspension arms, resilient means connected to the inner ends of said links and adapted to position said suspension arms laterally with respect to said chassis, a torsion bar spring having one of its ends secured to one of said lateral links and the other of its ends secured to the other of said lateral links, said torsion spring having torsional load segments extending generally parallel to the longitudinal axis of the vehicle, a bridge portion integrally interconnecting said torsional segments.

References Cited by the Examiner

UNITED STATES PATENTS

| | | | |
|---|---|---|---|
| 2,548,507 | 4/51 | Wharam et al. | 280—124 |
| 2,915,321 | 12/59 | Wilfert | 280—124 |
| 3,025,078 | 3/62 | Allison | 280—124 |

A. HARRY LEVY, *Primary Examiner.*